United States Patent [19]

Basehore et al.

[11] Patent Number: 5,260,847

[45] Date of Patent: Nov. 9, 1993

[54] SLEEVELESS ROTATABLE BERYLLIUM/ALUMINUM ACTUATOR ARM FOR A MAGNETIC DISC DRIVE

[75] Inventors: David W. Basehore, San Ramon; Frank I. Morris, San Jose; King L. Wong, Cupertino; Paul J. Hack; Leonard S. Bleininger, both of San Jose, all of Calif.

[73] Assignee: Maxtor Corporation, San Jose, Calif.

[21] Appl. No.: 779,301

[22] Filed: Oct. 18, 1991

[51] Int. Cl.$^5$ ................................................ G11B 5/55
[52] U.S. Cl. ........................................................ 360/106
[58] Field of Search .................. 360/104, 105, 106, 109

[56] References Cited

U.S. PATENT DOCUMENTS

| | | | |
|---|---|---|---|
| 4,710,834 | 12/1987 | Brand et al. | 360/105 |
| 4,774,610 | 9/1988 | Kinjo | 360/104 |
| 4,814,908 | 3/1989 | Schmitz | 360/77.02 |
| 4,860,135 | 8/1989 | Cain | 360/97.02 |
| 4,949,194 | 8/1990 | MacPherson et al. | 360/104 |
| 5,041,934 | 8/1991 | Stefansky | 360/106 |
| 5,161,077 | 11/1992 | Jabbari | 360/106 |

Primary Examiner—David C. Nelms
Assistant Examiner—John R. Lee
Attorney, Agent, or Firm—Blakely, Sokoloff, Taylor & Zafman

[57] ABSTRACT

A sleeveless rotatable beryllium/aluminum alloy actuator arm for a disk drive for a computer. A rotatable actuator for a magnetic disk drive for a computer is also described. The rotatable actuator includes a sleeveless beryllium/aluminum alloy arm, a suspension attached to a first end of the arm, a transducer attached to the suspension, and a voice coil attached to a second end of the arm.

13 Claims, 5 Drawing Sheets

FIG—1 (PRIOR ART)

FIG_2

FIG_3

FIG 7

SLEEVELESS ROTATABLE BERYLLIUM/ALUMINUM ACTUATOR ARM FOR A MAGNETIC DISC DRIVE

FIELD OF THE INVENTION

The present invention relates to the field of magnetic disk recording. More particularly, the present invention pertains to a sleeveless arm constructed of a beryllium-/aluminum alloy, wherein the arm is for a rotary actuator for a magnetic disk drive for a computer.

BACKGROUND OF THE INVENTION

Prior art hard magnetic disk drives have enjoyed widespread popularity as mass storage devices for personal computers. Hard disk drives are also referred to as fixed disk drives, rigid disk drives, and Winchester drives.

A rigid disk drive system typically includes a stack of disks mounted on a spindle. The disks are rotated by a motor. The disks reside inside an enclosure.

A transducer is typically used to read digital information from a rigid disk and to write digital information to the rigid disk. A transducer is also referred to as a magnetic head, a Winchester head, or simply as a head. A transducer is typically mounted at the end of a suspension attached to an arm of an actuator. A suspension is also referred to as a flexure.

Figure 1:
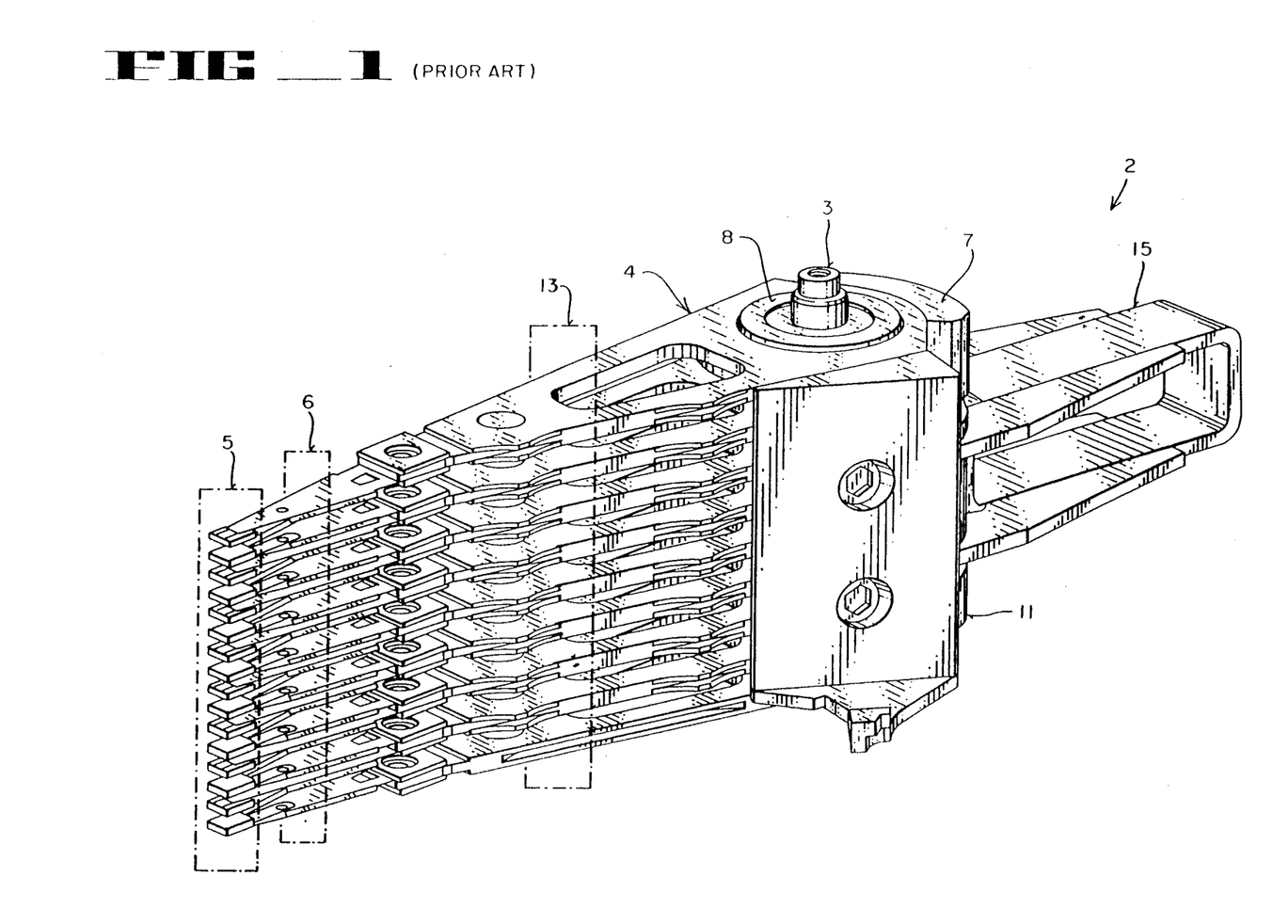
FIG. 1 is a perspective view of a prior art rotatable actuator that includes a steel sleeve buffer and two counterweights.

FIG. 1 illustrates one prior art actuator 2. Actuator 2 pivots about a spindle (not shown) that is inserted into bearing assembly 3. Actuator 2 includes armset 4, suspensions 6, transducers 5, counterweights 7 and 11, steel sleeve buffer 8, and magnetic structure 15. Armset 4 includes arms 13 as part of the body of armset 4. Suspensions 6 provide flexible mounts for the respective transducers 5.

In one prior art rigid disk drive, rigid disks (not shown) reside between pairs of arms 13. Voice coil 15 interacts with a magnet or magnets (not shown) to cause actuator 2 to rotate about a spindle (not shown) inserted into bearing assembly 3. The rotation of actuator 2 causes transducers 5 to move across the respective disks.

Digital information is written in circular tracks on the disks. The rotation of actuator 2 causes transducers 5 to move from track to track. In this way, digital information is written to and read from the disk tracks.

The rigid disk drive also includes electronic amplification circuitry (not shown) that amplifies signals sent by transducers 5. The disk drive also includes electronic control circuitry (not shown) that controls the positioning of the actuator. This control circuitry helps to place the heads or transducers over the desired tracks and helps to minimize track misregistration.

The design of the armset is important to the overall performance of the disk drive because it is the armset that positions the heads over the disks. The armset typically is made of a nonmagnetic material that is strong, yet lightweight. It typically is important that the material be nonmagnetic so as not to interfere with the magnetic reading/writing process. The armset should be strong enough to withstand frequent sudden movements. The armset should be relatively lightweight so that it can be moved quickly given a fixed amount of power for its movement. In other words, low inertia is typically important for an armset.

One reason that it is important that the armset have low inertia is to reduce the access time. The access time is defined as the time required to physically position each head to the exact place where the desired data is stored on the disk and the time to settle on track. The quicker the armset can be moved, the less time it takes to provide the requested data to the user.

Low inertia also often reduces power consumption. It requires less power to move and stop an armset having low inertia versus one having high inertia. Power consumption is often an important design parameter for disk drives installed in battery-powered laptop computers.

It is often preferable that the armset have a high stiffness to mass ratio. The higher the ratio, the higher the inherent frequency. A high inherent frequency often reduces the settling time. After an armset moves to a position and stops, the armset typically vibrates. A high stiffness to mass ratio typically reduces the amplitude of this vibration. A high stiffness to mass ratio typically reduces the settling time.

In the prior art, armsets have been constructed of aluminum in view of the design parameters mentioned above. Aluminum is also relatively inexpensive and easy to machine.

Aluminum armsets, however, have often given way to prior art magnesium armsets because magnesium typically has a higher stiffness to mass ratio and is less dense. Magnesium generally has low inertia. Consequently, magnesium armsets typically are associated with faster access times than comparable aluminum armsets.

Nevertheless, certain prior art magnesium armsets have disadvantages. One disadvantage is that a typical prior art magnesium armset has a coefficient of thermal expansion twice that of the steel bearing assembly connected to the armset. This thermal mismatch typically leads to undesirable stresses and distortions.

FIG. 1 shows a perspective view of one prior art magnesium armset 4. In order to minimize these thermal-induced stresses and distortions, a steel sleeve buffer 8 is used. Steel sleeve buffer 8 resides between armset 4 and steel bearing assembly 3. For one prior art magnesium armset, steel sleeve 8 was coated with a layer of tungsten disulfide to lower the coefficient of friction between the sleeve and armset.

One disadvantage is that steel sleeve 8 typically increases the mass of armset 4, thereby increasing the inertia of armset 4 and decreasing the access time. A further disadvantage of steel sleeve 8 coated with tungsten disulfide is the extra expense of having such a coating.

Another problem associated with thermal expansion is that of thermal misregistration. Metals typically expand as their temperatures are raised. This expansion can often cause transducers to be misaligned with the disk tracks, thereby creating problems in reading and writing data. Many prior art methods address this issue, some mechanical or electrical in nature. Some methods include a reliance on software.

Another disadvantage of a typical prior art magnesium armset is that the magnesium armset typically must be relatively thick to withstand the shock of movement. This thickness adds to the weight of the armset. As a consequence, at least one counterweight is typically required to balance the weight of the armset. FIG. 1 shows two lead counterweights 7 and 11 for armset 4.

Moreover, the fact that a typical magnesium armset is relatively thick means that there are fewer arms for a given height of an armset. This means that the drive can accommodate fewer disks for a given height of an armset.

A further disadvantage of a typical prior art magnesium armset is that given its inherent properties, disk drive access times of less than 10 milliseconds are hard to achieve.

Beryllium has been used in the prior art as an aerospace structural material and as a moderator and reflector in nuclear reactors. Among the metals beryllium, magnesium, aluminum, titanium, and steel, the two metals that are the least dense are beryllium and magnesium. Among the metals beryllium, magnesium, aluminum, titanium, and steel, the metal beryllium has the highest modulus of elasticity. Beryllium also has a moderate tensile strength. Additionally, beryllium is relatively resistant to corrosion and has a relatively high melting point.

One disadvantage of beryllium is its high cost. Another disadvantage is that the machining of beryllium is relatively difficult and expensive.

SUMMARY AND OBJECTS OF THE INVENTION

One object of the present invention is to reduce the mass and, hence, the inertia of an actuator arm for a magnetic disk drive for a computer.

Another object of the invention is to provide an actuator arm with a coefficient of thermal expansion relatively close to that of steel, thereby eliminating the need for a steel sleeve buffer.

Another object of the present invention is to design an actuator arm with a relatively low coefficient of thermal expansion.

Another object of the present invention is to reduce the weight of the arms of an armset such that a counterweight is not required.

Another object of the present invention is to reduce the thickness of a portion of an actuator arm to increase the space available for one or more magnetic disks.

Another object of the present invention is to provide an actuator arm with a relatively high stiffness to mass ratio.

Another object of the present invention is to minimize the settling time of an actuator arm.

Another object of the present invention is to minimize the average access time for a hard disk drive.

Another object of the present invention is to help to reduce the average access time of a disk drive to less than 10 milliseconds.

A sleeveless rotatable beryllium/aluminum alloy actuator arm for a disk drive for a computer is described.

Other objects, features, and advantages of the present invention will be apparent from the accompanying drawings and from the detailed description that follows below.

BRIEF DESCRIPTION OF DRAWINGS

The present invention is illustrated by way of example and not limitation in the figures of the accompanying drawings, in which like references indicate similar elements, and in which.

DETAILED DESCRIPTION

Figure 2:
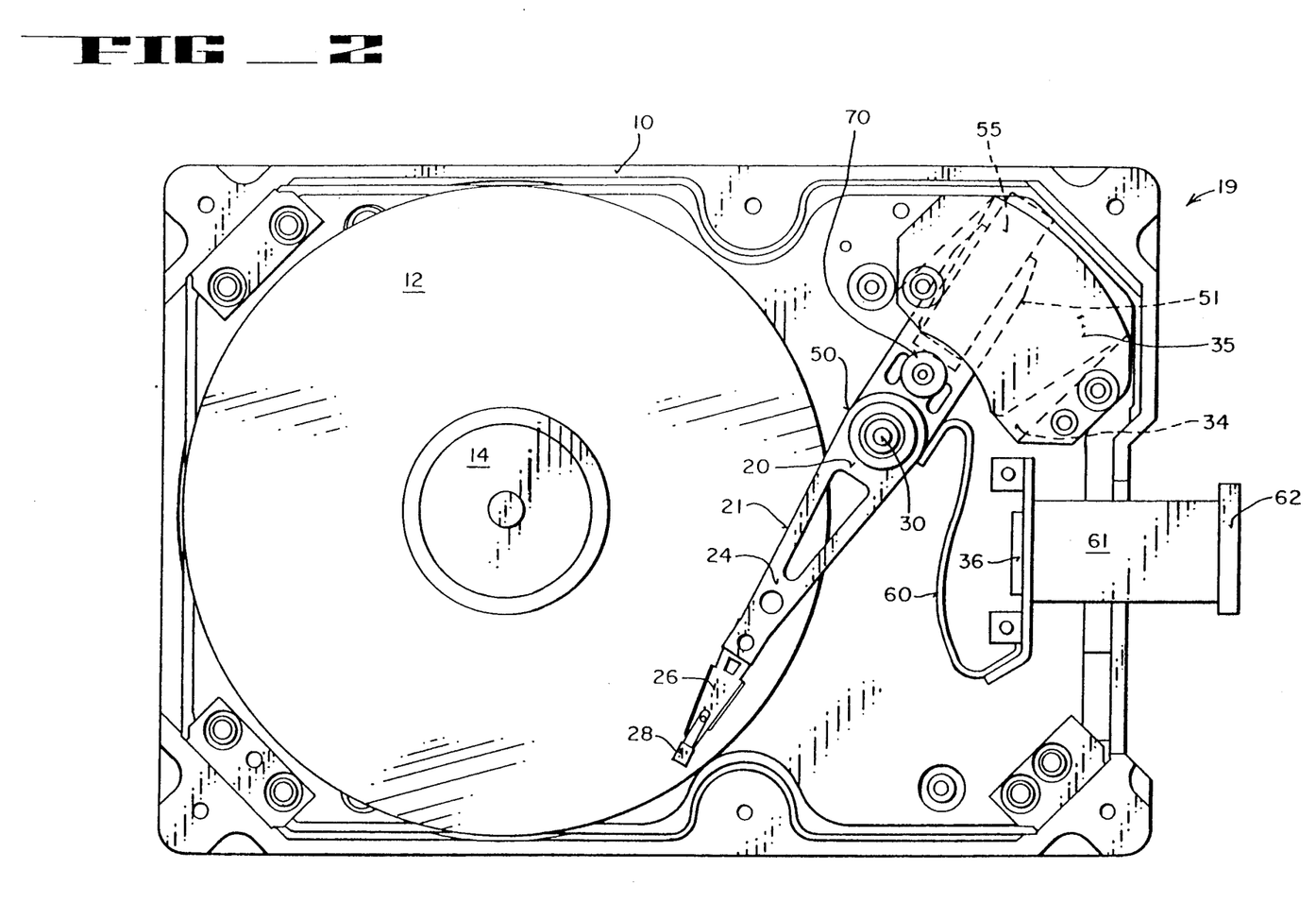
FIG. 2 is a top view of a rigid disk drive with a rotatable actuator with a beryllium/aluminum alloy armset.

FIG. 2 is a cutaway top view of a rigid disk drive 19. In one embodiment, disk drive 19 is electrically coupled to a host personal computer (not shown) that uses disk drive 19 for mass storage of digital information.

Disk drive 19 includes an enclosure 10 housing a plurality of magnetic disks 12 in a stacked arrangement. Only the top disk is shown in FIG. 2. Disks 12 are mounted to a central hub 14. The central hub 14 and disks 12 are coupled to a motor (not shown) that rotates disks 12. For one embodiment, disks 12 are rotated at approximately 6300 revolutions per minute. For other embodiments, other speeds of rotation are used.

Each of the disks 12 includes magnetic tracks laid out in a series of concentric circles. The disk tracks are circular magnetic encodings of digital information. The digital information includes, for example, data, code, and an operating system for the personal computer. The digital information also includes servo tracking information and other information for disk drive 19.

In one embodiment, disks 12 each have a diameter of 3.5 inches. In alternative embodiments, disks 12 are smaller or larger than 3.5 inches.

In one embodiment, disks 12 store forty megabytes of digital information. In alternative embodiments, disks 12 store less than forty megabytes of information or more than forty megabytes of information.

Actuator 21 of FIG. 2 includes armset 20, a plurality of stainless steel suspensions 26, a plurality of transducers 28, rear brackets 51 and 52, a voice coil 55, steel bearing assembly 30, and stop 70. Rear brackets 52 is not visible in FIG. 2.

Actuator 21 rotates about a steel spindle that resides in the center of steel bearing assembly 30. Two magnets 35 within enclosure 34 interact with voice coil 55 coupled to rear brackets 51 and 52 and cause actuator 21 to rotate in a manner responsive to the amplitude and polarity of the current through the voice coil 55. Only one of the two magnets 35 is visible in FIG. 2.

Electric control circuitry (not shown) of disk drive 19 sends control currents to voice coil 55 via connector 62, connector 61, and flex connector 60. In addition, upon power-off, a back emf signal originating with the motor is sent to voice coil 55 in order to park actuator 21 for one embodiment.

Armset 20 includes a body 50 that surrounds steel bearing assembly 30. Armset 20 also includes rear sets of brackets 51 and 52 that hold the voice coil 55. The rear sets of brackets 51 and 52 are connected to body 50. Armset 20 further includes a plurality of arms 24 that reside above and below the respective hard disks 12. The plurality of arms 24 are connected to armset body 50.

As described in more detail below, in one embodiment armset 20 is fabricated from a beryllium- /aluminum alloy. Body 50, brackets 51 and 52, and arms 24 are thus made out of the beryllium/aluminum alloy.

Stainless steel suspensions 26 are connected to the ends of the respective arms 24 of armset 20. Suspensions 26 are also referred to as flexures 26. At the opposite ends of the respective suspensions 26 are mounted transducers 28. Suspensions 26 act as flexible spring-like pieces for holding transducers 28.

Transducers 28 are also referred to as magnetic heads 28, Winchester heads 28, and heads 28.

Although not fully shown in FIG. 2, a plurality of arms 24, a plurality of suspensions 26, and a plurality of transducers 28 reside above and below the respective disks 12.

Transducers 28 are used to read the digital information stored magnetically on the tracks of disks 12 and convert that digital information to electrical signals that are sent to the read/write data chip 36 via, flex connector or circuit 60. The electrical signals are then sent from drive 19 to the host computer via flex connector or circuit 61 and connector 62.

Transducers 28 are also used to write information onto the magnetic tracks of disks 12. The information that is to be written is sent by the host computer to read/write data chip 36 via connector 62 and flex circuit 61. The electrical signals from read/write data chip 36 are then sent to transducers 28 via flex connector/circuit 60.

As disks 12 rotate, suspensions 26 allow transducers 28 to float above (and below) disks 12. The rotation of actuator 21 causes transducers 28 to move across disks 12 between points within the respective inner and outer diameters of disks 12. Transducers 28 thus move from track to track as actuator 21 is rotated. The rotation of disks 12 and the rotation of actuator 21 give transducers 28 the capability to access all the digital information stored on all the tracks of disks 12.

For a preferred embodiment shown in FIG. 2, neither armset 20 nor actuator 21 includes any separate attached counterweight.

For other embodiments, armset 20 has fewer or more arms in place of arms 24. For one embodiment, armset 20 has only one arm instead of the plurality of arms 24. For that embodiment, actuator 20 has only one suspension in place of the plurality of suspensions 26 and only one transducer in place of transducers 28.

For one alternative embodiment, actuator 21 has only set of rear brackets to hold a voice coil. For yet another alternative embodiment, actuator 21 has only one rear bracket to hold a voice coil.

In an alternative embodiment, voice coil 55 and magnets 35 within enclosure 34 are replaced by a stepper motor.

In an alternative embodiment, disk drive 19 is instead an optical disk drive. For that alternative embodiment, disks 12 are replaced by optical disks and transducers 28 are replaced by lasers, for example. Circuitry 36 is replaced by circuitry specific to the optical drive.

Figure 3:
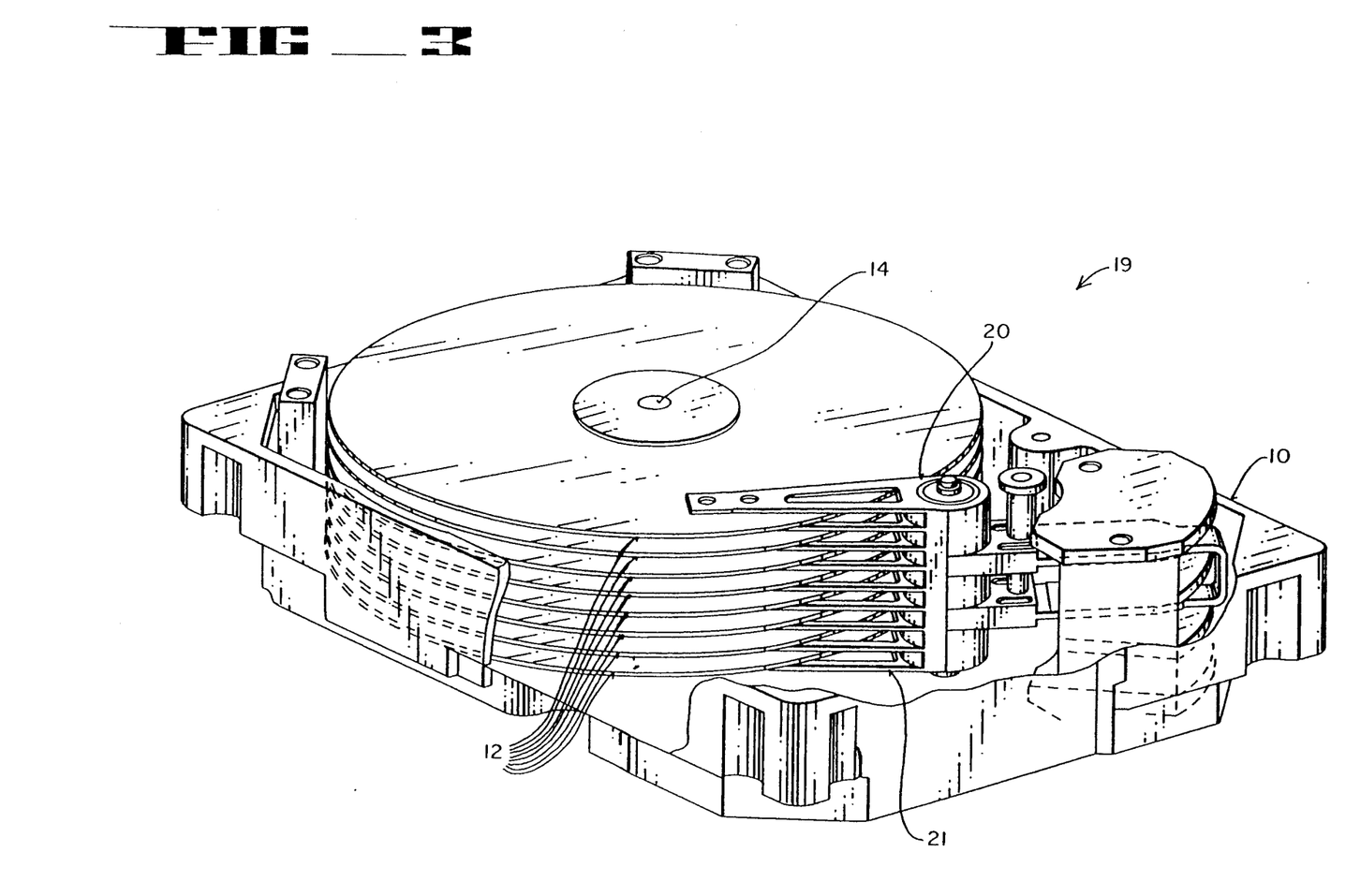
FIG. 3 is a perspective view of a rigid disk drive with a rotatable actuator with a beryllium/aluminum alloy armset.

FIG. 3 is a perspective view of rigid disk drive 19 and beryllium/aluminum armset 20, and actuator 21. Disks 12 are mounted to central hub 14. FIG. 3 shows portion 10 of the disk drive housing.

Figure 4:
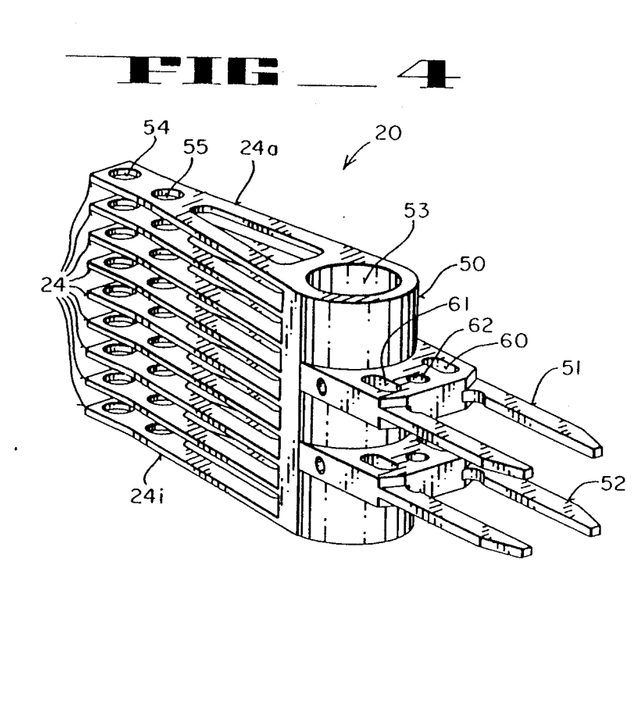
FIG. 4 is a perspective view of a beryllium/aluminum alloy armset.

FIG. 4 is a perspective view of armset 20. Armset 20 is comprised of a swivel member 50, a plurality of arms 24, and sets of brackets 51 and 52. Swivel member 50 is a vertical pipe-like structure with a cylindrical hole 53. Bore hole 53 runs through the length of swivel member 50 and has a radius of approximately 0.3753 inches.

Bearing assembly 30 (shown in FIG. 2) is placed within cylindrical hole 53. Swivel member 50 is also referred to as body 50 of armset 20.

One end of each of the arms 24 is connected to swivel member 50. Brackets 51 and 52 are connected to the swivel member 50 opposite the arms.

In one preferred embodiment, no steel sleeve buffer is placed in cylindrical hole 53 between armset body 50 and steel bearing assembly 30 that is placed in cylindrical hole 53. The lack of any steel sleeve buffer means that steel bearing assembly 30 directly contacts swivel body 50 of armset 20.

For an alternative embodiment with an "armset" having a single arm, the portion of the "armset" corresponding to swivel member 50 is also referred to as simply a portion of the arm.

In one preferred embodiment, arms 24 comprise nine arms. Eight disks 12 are placed between respective pairs of arms 24. No disk resides above arm 24a and no disk resides below arm 24i. The top arm 24a is connected to one suspension and one transducer. The bottom arm 24i is connected to one suspension and one transducer. The arms of arms 24 residing between arms 24a and 24i are each coupled to two suspensions and two transducers. This arrangement means that each of the eight disks 12 has a transducer above the top of the disk and a transducer below the bottom of the disk.

Arms 24 are each approximately 0.0285 inches thick. Arms 24 extend approximately 1.495 inches from the center of bore hole 53. Arms 24 are spaced approximately 0.123 inches apart and are parallel to each other. From the tip of arm 24a to the tip of brackets 51 is approximately 2.835 inches. The height from the bottom of arm 24i to the top of arm 24a is approximately 1.013 inches.

As shown in FIG. 4, arms 24 each are shaped like an isosceles triangle with an isosceles triangular center portion removed so as to provide lateral stabilization with decreased weight. The width of this triangular portion is approximately 0.090 inches. The tips of arms 13 are approximately 0.200 inches wide and have two holes 54 and 55. Hole 54 is used to mount one of the suspensions 26 for carrying one of the transducers 28. Hole 55 is a tooling hole used in the manufacturing process to define a reference point. Hole 55 also serves to reduce weight. Holes 54 and 55 are repeated for each of the arms 24.

FIG. 4 shows two sets of substantially U-shaped brackets 51 and 52 connected to swivel member 50 opposite arms 24. A voice coil 55 (not shown in FIG. 4) is connected to brackets 51 and 52. The interaction between the voice coil 55 and magnets 35 (not shown in FIG. 4) of disk drive 19 cause armset 20 to rotate about an axis of rotation running through approximately the center of cylindrical hole 53.

The two oval holes 60 and 61 for brackets 51 are lightening holes to reduce the mass and weight of the armset and to statically balance the armset. Holes 60 and 61 also provide reference positions during servo writing. Hole 62 for brackets 52 is used to mount a crash stop (not shown in FIG. 4). Holes 60, 61, and 62 are repeated for brackets 52.

Figure 5:
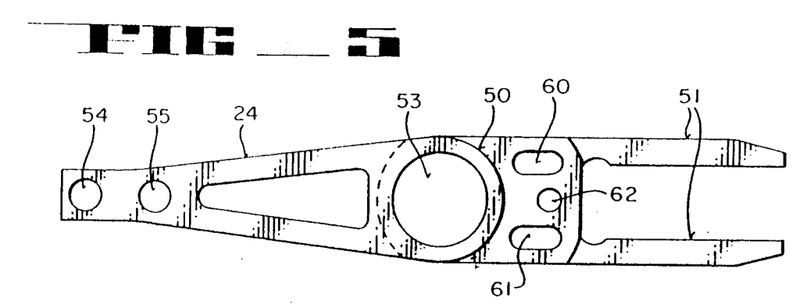
FIG. 5 is a top view of the beryllium/aluminum alloy armset.
Figure 6:
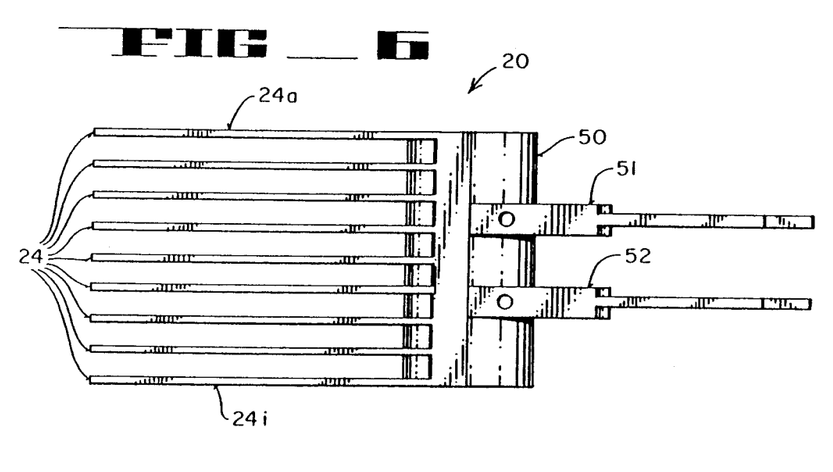
FIG. 6 is a side view of the beryllium/aluminum alloy armset.

FIGS. 5 and 6 are top and side views of armset 20.

Figure 7:
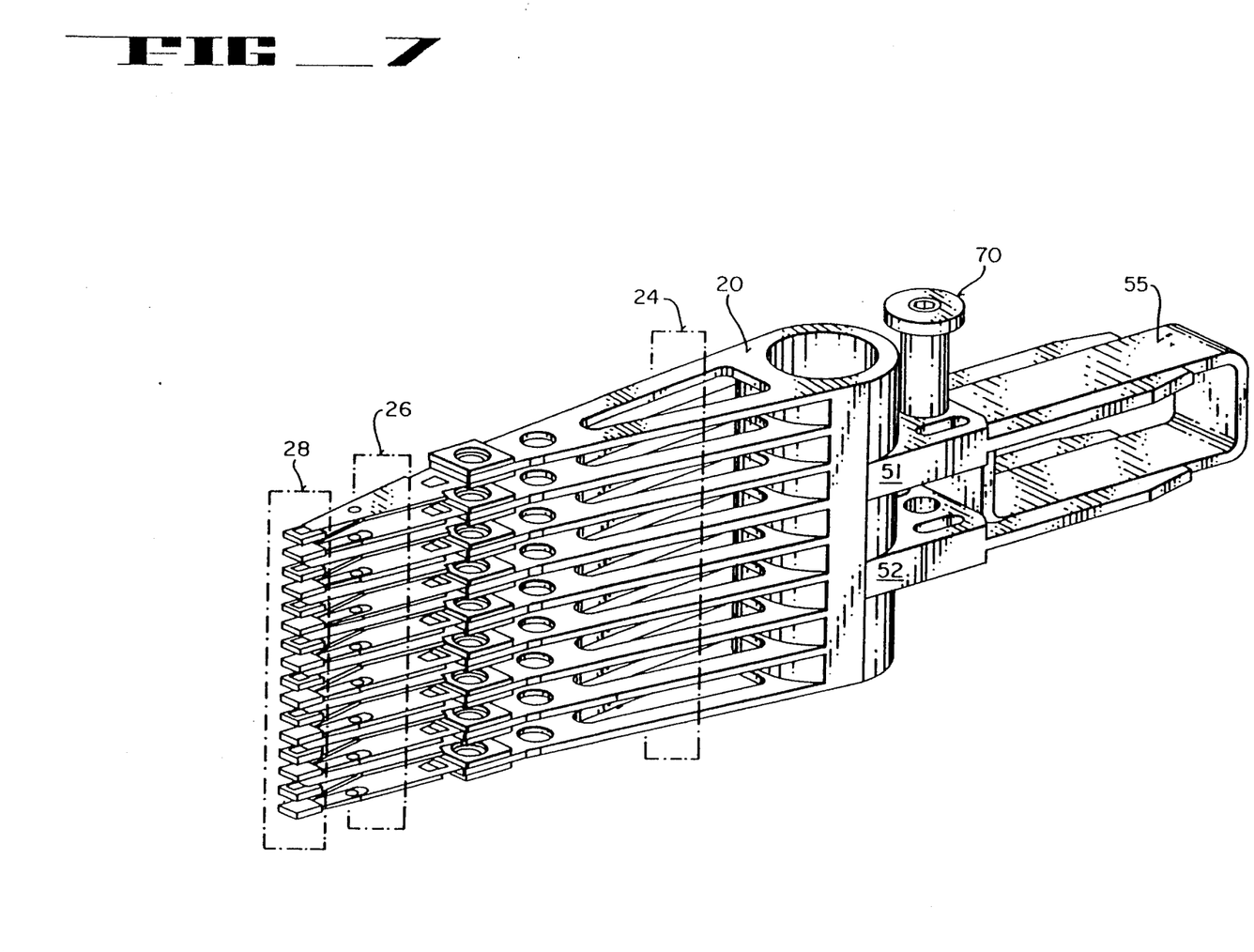
FIG. 7 is a perspective view of a beryllium/aluminum alloy armset and transducers, suspensions, a crash stop, and a voice coil.

FIG. 7 is another perspective view of a beryllium/aluminum armset 20 that is part of actuator 21. Also shown are crash stop 70, brackets 51 and 52, voice coil 55, arms 24, suspensions 26, and transducers 28.

In one preferred embodiment of the present invention, armset 20 shown in FIGS. 3, 4, and 5 is entirely fabricated out of a beryllium/aluminum alloy. Thus, arms 24, body 50, and brackets 51 and 52 are made out of the beryllium/aluminum alloy. The beryllium/aluminum alloy is also referred to as beryllium/aluminum. For one preferred embodiment, the ratio of beryllium to aluminum is approximately 4:1. The four-to-one beryllium/aluminum alloy is sold by Electrofusion Corporation of Fremont, Calif.

In alternative embodiments, alloys having different ratios of beryllium to aluminum are used.

Beryllium/aluminum is nonmagnetic. It is important that armset 20 be made out of a nonmagnetic substance because of the close proximity of armset 20 to the disks 12. Disks 12 store digital information magnetically. Interference with the magnetic recordings stored on disks 12 is minimized by use of the beryllium/aluminum alloy rather than a magnetic material. Furthermore, the beryllium/aluminum alloy helps to avoid extraneous magnetic interferences during writing and reading of information to and from disks 12 that might otherwise arise with a magnetic material.

Armset 20 constructed of beryllium/aluminum is relatively strong. Armset 20 can potentially sweep through an arc of approximately 21.8 degrees when moving from one end of a data stroke to another. This movement of armset 20 corresponds to the movement of transducer 28 from an inner radial position over magnetic disks 12 to an outer radial position. Given access times of the order of milliseconds in which armset 20 might be required to swing 21.8 degrees, beryllium/aluminum armset 20 is nevertheless strong enough to withstand such torques. Moreover, beryllium/aluminum armset 20 is relatively durable over time.

Beryllium/aluminum armset 20 is relatively low in weight. For one embodiment, armset 20 weights approximately 7.0 grams. Beryllium/aluminum has a density of approximately 0.076 lb/in$^3$. Aluminum can typically have a density of approximately 0.11 lb/in$^3$. Magnesium can typically have a density of approximately 0.07 lb/in$^3$. Beryllium/aluminum thus has a lower density than aluminum and a slightly higher density than magnesium. Even though beryllium/aluminum has a slightly higher density than magnesium, this is more than offset by the fact that beryllium/aluminum is stronger and stiffer. A lesser density corresponds to a lower weight.

Given the relatively low weight of beryllium/aluminum and the relative thin profile of arms 24, neither actuator 21 nor armset 20 needs a separate counterweight to achieve static balance for one preferred embodiment. Static balance means balanced in every orientation. The static balance of armset 20 is important in order that transducers 28 do not stray from their tracks when subjected to shock and vibration.

Keeping the weight down is important because the less an armset weighs, the lower its inertia becomes. One preferred beryllium/aluminum armset 20 has a moment of inertia of approximately $8.03 \times 10^{-6}$ kg·M$^2$, which is relatively low.

Low inertia has advantages. Low inertia helps to decrease disk access time. Access time is defined as the time required to physically position transducers 28 to the location where the desired data resides on disks 12 and the time to settle on track. The low weight of beryllium/aluminum helps armset 20 to move relatively quickly to reach a track for a given current in the voice coil. The fact that beryllium/aluminum is relatively light in weight also allows armset 20 to stop relatively quickly once a track is reached.

Low inertia also helps to reduce the amount of power required to move an armset. It requires less effort to move and bring to a stop a lighter object than a heavier one. Low inertia helps to improve power efficiency. Power efficiency is especially important in battery-powered laptop computers. Conservation of power improves battery life.

Given (1) relatively thin profile of arms 24, (2) the lack of any counterweights, (3) the lack of any steel buffer sleeve, and (4) the relatively low weight of beryllium/aluminum, it is to be appreciated that the inertia of armset 20 is minimized.

Minimizing the inertia of armset 20 minimizes the energy product that is required for magnets that interact with the voice coil 55 of actuator 21. A magnet with a lower energy product is generally a lower grade magnet that is generally cheaper, which helps to reduce costs.

Beryllium/aluminum has a relatively high stiffness to mass ratio. Beryllium/aluminum has a modulus of elasticity of approximately $28 \times 10^6$ psi. The modulus of elasticity of typical aluminum is approximately $10 \times 10^6$ psi. The modulus of elasticity of typical magnesium is approximately $6 \times 10^6$ psi.

After armset 20 is moved to and stops at a desired position (i.e., arrives on track), areset 20 will have some residual vibration. Data cannot be written to nor read from disks 12 until this vibration subsides somewhat. The time it takes for this residual vibration to subside so that data can be accessed is defined as the settling time. The relatively high modulus of elasticity of beryllium/aluminum helps to reduce settling time for armset 20. Reducing settling time helps to reduce disk access time.

Vibration of an armset has two components—namely, amplitude and frequency.

Beryllium/aluminum armset 20 has a relatively high resonant frequency. Beryllium/aluminum also helps to reduce the amplitude of the vibration of armset 20.

A relatively high resonant frequency and a relatively low amplitude of vibration helps to improve tolerances with respect to tracking.

The specific modulus of a material is defined as the ratio between the modulus of elasticity and the density. Beryllium/aluminum has a relatively high specific modulus.

In one embodiment, arms 24 shown in FIG. 5 are each approximately 0.0285 inches thick. The relatively high stiffness to mass ratio of beryllium/aluminum helps to allow arms 24 to be so thin.

As shown in FIGS. 2, 4, and 5, beryllium/aluminum armset 20 does not have a steel sleeve. Beryllium/aluminum has a coefficient of thermal expansion of approximately $8.0$ in./°F $\times 10^{-6}$. This coefficient is relatively close to that of the steel bearing assembly 30. Consequently, there is only a relatively slight thermal mismatch, and a steel sleeve buffer is not required.

Having an armset design with a coefficient of thermal expansion close to that of steel offers several advantages. As discussed above, it allows for the elimination of the steel sleeve buffer. The mass and, hence, inertia of the armset is reduced. This helps to reduce access time and power consumption. Furthermore, costs are minimized because there is no need to purchase or manufacture the steel sleeve and there is no need for the manufacturing step of placing the steel buffer sleeve in cylindrical hole 53. This helps to reduce manufacturing time for a disk drive 19 because one less item needs to be assembled. There are also handling, planning, and processing savings in terms of money and time. Moreover, no tungsten disulfide coating is required for armset 20.

The use of beryllium/aluminum for armset 20 helps to maximize reliability and production yields given that thermal-induced stresses and distortions between the armset 20 and steel bearing assembly 30 are minimized. Moreover, by eliminating the steel buffer sleeve, there is one less part that is potentially defective or that potentially could cause a defect.

In one embodiment, disk drive 19 has a thermal compensation system. In an alternative embodiment, no separate terminal compensation system is used by the disk drive.

In the foregoing specification, the invention has been described with reference to specific exemplary embodiment thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

What is claimed is:

1. A rotatable armset of an actuator having a sleeveless bore for rotating about a spindle of a disk drive for positioning a transducer radially across a disk of the disk drive, wherein the armset is a one piece unit entirely comprised of an alloy of beryllium and aluminum.

2. The rotatable armset of claim 1, wherein the armset of the actuator is a one piece assembly having a body portion, a plurality of arms, and a rear set of brackets portion.

3. The rotatable armset of claim 2, wherein a bearing assembly is interposed between the bore and the spindle.

4. The rotatable armset of claim 3, wherein the alloy is comprised of four parts beryllium to one part aluminum.

5. The rotatable armset of claim 4, wherein the bearing assembly is comprised of steel bearings.

6. The rotatable armset of claim 5, wherein a voice coil is fixedly attached to the rear brackets.

7. The rotatable armset of claim 6, wherein the alloy of beryllium and aluminum has a modulus of elasticity of approximately $28 \times 10^6$ psi.

8. The rotatable armset of claim 7, wherein the alloy of beryllium and aluminum has a coefficient of thermal expansion of approximately $8 \text{ in}/°F \times 10^{-6}$.

9. The rotatable armset of claim 8, wherein the armset has a moment of inertia of approximately $8 \times 10^{-6}$ kg·M².

10. In a disk drive system, an actuator for movably positioning and supporting a transducer over a disk of the disk drive, wherein the actuator comprises:
   an armset comprised entirely of an alloy of beryllium and aluminum having a sleeveless bore for pivoting about a spindle;
   a bearing assembly interposed between the armset and the spindle;
   a flexible suspension coupled at one end to the armset;
   a transducer coupled to an opposing end of the suspension;
   a voice coil coupled to a set of brackets of the armset, wherein the voice coil and the brackets are placed opposite to the suspension and transducer, wherein a counter weight is not required to balance the armset relative to the bore.

11. The actuator of claim 10, wherein the ratio of beryllium to aluminum of the alloy is approximately 4:1.

12. The actuator of claim 11, wherein the alloy has a thermal coefficient of expansion of approximately $8 \text{ in}/°F \times 10^{-6}$.

13. The actuator of claim 12, wherein the armset has a moment of inertia of approximately $8 \times 10^{-6}$ kg·M².

* * * * *